(12) United States Patent
Misu

(10) Patent No.: US 6,176,149 B1
(45) Date of Patent: Jan. 23, 2001

(54) BALL SCREW HAVING SPACERS

(75) Inventor: Hiroshi Misu, Nara-ken (JP)

(73) Assignee: Tsubaki Nakashima Co., Ltd., Hyogo-ken (JP)

(*) Notice: Under 35 U.S.C. 154(b), the term of this patent shall be extended for 0 days.

(21) Appl. No.: 09/322,115

(22) Filed: May 28, 1999

(51) Int. Cl.[7] ................................................. F16H 55/17
(52) U.S. Cl. ..................... 74/459; 74/89.15; 74/424.8 R; 74/521
(58) Field of Search ................................. 384/45, 49, 51, 384/521; 74/89.15, 424.8 R, 459

(56) References Cited

U.S. PATENT DOCUMENTS

| | | | |
|---|---|---|---|
| 785,663 | * | 3/1905 | Chapman ............................. 384/521 |
| 2,995,947 | | 8/1961 | Grabowski . |
| 3,053,105 | * | 9/1962 | Cole ................................... 384/43 X |
| 4,542,661 | * | 9/1985 | Teramachi ....................... 74/424.8 R |
| 5,154,091 | * | 10/1992 | Bianco .................................. 74/459 |
| 5,467,662 | * | 11/1995 | Lange et al. ........................... 74/459 |
| 5,653,145 | * | 8/1997 | Kobayashi et al. .................... 74/459 |
| 5,927,858 | * | 7/1999 | Agari ..................................... 384/45 |
| 6,070,479 | * | 6/2000 | Shirai .................................. 74/89.15 |

FOREIGN PATENT DOCUMENTS

| | | |
|---|---|---|
| 47-3455 | 1/1972 | (JP) . |
| 61-283634 | 12/1986 | (JP) . |

OTHER PUBLICATIONS

Screw Thread Referencing Guide Editing Committee, "Screw Thread Reference Guide", *Nikkan KogyoShimbun Co., Ltd.*, 1: p. 315 (May 20, 1966).
NTN Technical Review No. 58, "Oscillation Characteristics of Ball Screws", *NTN Co., Ltd.* pp. 30–35 (1990).
Miroru Izawa, "Ball Screw Application Technology", *Kogyo Chosakai Publishing Co., Ltd.*, 1: pp. 71–72 (May 20, 1993).

* cited by examiner

*Primary Examiner*—David A. Bucci
*Assistant Examiner*—Colby Hansen
(74) *Attorney, Agent, or Firm*—Howson & Howson

(57) ABSTRACT

Spacers 26 each of which has a concave surface 27 complementary to the spherical surface of a ball 25 at each end thereof are disposed at areas between the adjacent balls 25, 25. A ball circulation mechanism comprises; a through hole 15 which extends in parallel to an axial line 4 of the ball nut 12 inside a thick wall part 14 of the ball nut 12; and adapters 23, 24 having open ends 23a, 24a provided with tongue portions 23c, 24c for scooping up or returning balls 25 between a ball screw groove 11 of a ball shaft 10 and a ball screw groove 13 of the ball nut 12, and the other open ends 23b, 24b being connected to be in communication with the through hole 15, and each adapter being fitted into recesses 16, 17 provided on both axial ends in the thick wall part 14 of the ball nut 12. Therefore, there is no need of upsizing a ball screw, and thus a compact ball screw which has a high load-carrying capacity and is suitable for a reciprocating movement can be provided.

8 Claims, 10 Drawing Sheets

BALL SCREW HAVING SPACERS

FIELD OF THE INVENTION

The present invention relates to a ball screw used for various feed mechanisms. More particularly, it relates to a ball screw which has a high load-carrying capacity and is suitable for repetitive back-and-forth operations with minute feedings, namely, reciprocating movements.

PRIOR ART

There is a ball screw known which comprises a screw shaft including a ball screw groove on the outer peripheral surface thereof., a ball nut including on the inner peripheral surface thereof another ball screw groove opposed to the ball screw groove, and a plurality of balls installed between the both ball screw grooves and adapted to circulate by a ball circulation mechanism provided in the ball nut.

For example, in U.S. Pat. No. 2,995,947, there is disclosed a ball screw in which a "return tube" is used as a ball circulation mechanism and of which number of effective turns is 6.5 and number of circuit(s) is one. However, such a ball screw having 6.5 effective turns is not yet put into a tangible form because of the reasons mentioned below.

Incidentally, the "number of effective turns", "one circuit" and the "number of circuits" respectively mean the number of times the balls installed in one circuit turn around the periphery of a screw shaft, one closed circuit comprising the ball screw groove in which balls are installed and the ball circulation mechanism, and the number to indicate how many such circuits are incorporated (see "Screw Thread Reference Guide", the first edition (1966. 5.20), p315; edited by Screw Thread Reference Guide Editing Committee and issued by Nikkan Kogyo Shimbun Co., Ltd.).

Though the degree depends on the machined accuracy and so on of the ball screw groove, it has been experienced that a normal feeding operation with more than 120 balls installed in one circuit of a ball nut brings about an increase in dynamic friction torque caused by the adjoining balls rotating in the same direction and pressing against each other, a ball clogging phenomenon, an early wear and a ball slipping phenomenon, which may cause an early fracture. Further, the dynamic friction torque in a normal feeding operation is hereafter called "normal friction torque".

Accordingly, commercial ball screws have the following features:

(1) When a "return tube" or a "guide plate" is used as a ball circulation mechanism, the number of effective turns is 3.5 at the maximum (since the number of balls in one circuit exceeds 120 in the case of more than 3.5 turns).

(2) When an "end cap" is used as a ball circulation mechanism, the number of effective turns is 2.8 at the maximum. Further, since a manufacturing cost of the end cap itself is high, above ball circulation mechanism is seldom used except for a fast lead or an ultra-fast lead which are suitable for high-speed requirements.

(3) When a "barrel" is used as a ball circulation mechanism, the number of effective turn(s) is one. Since the number of balls that can be installed in one circuit is at most 60, except the case when the later-described reciprocating movement is made, an increase in a normal friction torque, the ball clogging phenomenon and the ball slipping phenomenon rarely occur. However, since the load-carrying capacity that the balls in one circuit can bear is low, the number of circuits are adjusted to be somewhere between 2 and 6 to secure the load-carrying capacity for a ball screw.

Further, the followings must be noted:

1) The number of balls when the number of effective turn(s) is one is estimated according to a diameter of a ball used, a center circular diameter of the ball and a lead of the ball.

The formula used here is as follows:

(Number of balls in one circuit)=(Number of balls in one turn×Number of effective turns)+(Number of balls in Ball circulation mechanism)

2) The number of balls in the total number of effective turns (Number of effective turns×Number of circuits) is estimated according to working conditions (Axial load and Useful life) of the ball screw. Then, when a ball circulation mechanism is a "return tube" or a "guide plate", the total number of effective turns chosen are 2.5×2, 3.5×1 and so on, considering a positional relation and so on between an entire length of the ball nut and an insertion hole in which a pickup tube introducing balls into a parallel portion of the return tube or the guide plate is inserted.

Even though the number of balls in one circuit is limited to 120 or less, however, it was experienced during a reciprocating movement that an increase in friction torque during the reciprocation (hereafter called "reciprocating friction torque") and a ball clogging phenomenon occurred.

Therefore, when the reciprocating movement is made, a spacer ball having a diameter 50 to 60 μm smaller than that of a ball being used is utilized at the same time. For example, according to "Oscillation Characteristics of Ball Screws" on pages 30–35 of "NTN TECHNICAL REVIEW No. 58 (1990) issued by NTN Co., Ltd., a preferable incorporation rate of the ball and the spacer ball is 1:1.

Further, it is believed that a spacer ball is used because it alleviates a biting phenomenon of balls on a surface of a ball screw groove caused by the friction among the balls.

In recent years, ball screws have come to be used under high loading conditions such as in an injection molding machine, a press and so on. Further, some of high-loading usage of the injection molding machine and so on require a ball screw to make a reciprocating movement.

In the past, in order to cope with the high-loading usage, a shaft diameter of a screw shaft was increased (naturally, the ball nut also had to be larger), the number of circuits in the ball nut was increased, and the size of the lead was increased so that a diameter of the ball used might be larger.

However, the following inconveniences were observed:

(1) It was often impossible to adopt the method of making the shaft diameter of the screw shaft larger because of the limited space in a machine. Also, a high-capacity motor was required due to an increase in a moment of inertia, which brought about a higher cost.

(2) To increase the number of circuits in a ball nut means to make the ball nut larger and longer. Therefore, there was a problem that such a measure could not be taken when a stroke of the ball nut is limited. Also, there was another problem of a sharp increase in a processing cost. Furthermore, there were some occasions when a manufacturing of the ball nut was impossible.

(3) To make the lead larger and the diameter of the ball used larger means to upsize the ball nut. Accordingly, there were many cases when such measures could not be adopted because of the limited space in machines. Also, when the ball nut was not upsized, a thick wall between an outer surface of the ball nut and the ball screw groove remained thin and caused a problem in terms of strength.

To cope with problems in the reciprocating movement, the usage of the above-described spacer ball is effective. (More specifically, it is preferable that an incorporation rate of the ball and the spacer ball is 1:1).

However, when the incorporation rate is 1:1, an axial loading that can be borne is reduced to half its original value (the basic dynamic load rating showing a load-carrying capacity is reduced to about 60% of its original value), which brings about a problem that the application to the high load-carrying usage such as in the above injection molding machine and so on is not possible.

The present invention was made in view of the above problems, and it is an object of the invention to provide a ball screw which doesn't have to be upsized, being compact and possessing the high load-carrying capacity, and further being preferable for a reciprocating movement.

SUMMARY OF THE INVENTION

In accordance with the present invention, the aforementioned problems can be solved by a ball screw, comprising: a screw shaft including a ball screw groove in the outer peripheral surface thereof; a ball nut including in the inner peripheral surface thereof another ball screw groove opposed to the ball screw groove; and a plurality of balls which are installed between the both ball screw grooves and are adapted to circulate by a ball circulating mechanism provided in the ball nut, wherein spacers each of which has a concave surface complementary to the spherical surface of the ball at each end thereof are disposed at areas between the adjacent balls, and the ball circulation mechanism comprises a through hole which extends in parallel to an axial line of the ball nut inside a thick wall thereof, and adapters having open ends provided with tongue portions for scooping up or returning balls between the both ball screw grooves and the other open ends being connected to be in communication with the through hole and each being fitted into recesses provided on both axial ends in the thick wall of the ball nut.

Also, the ball circulation mechanism may comprise a tube mounted on the outer peripheral surface of the ball nut in parallel to the axial line of the ball nut, and adapters having open ends provided with tongue portions for scooping up or returning balls between the both screw grooves and the other open ends being connected to be in communication with the tube and each being fitted into recessed portions provided on both axial ends of the ball nut.

Further, it is preferable that vertexes of the adjacent balls having the spacer therebetween are spaced within the range of 0.1 mm to 0.3 mm.

Still further, it is more preferable that one open end having the tongue portion of the adapter extends tangentially with respect to an imaginary cylinder, in which is a helical trajectory of the center of a ball located between the lies ball screw grooves.

According to the present invention, it is possible to install balls almost throughout the entire length of the ball nut. Therefore, compared with a conventional type having a ball nut whose outer diameter and entire length are the same, a ball screw having a higher load-carrying capacity and greater stiffness is obtained.

Further, even when more than 120 balls are installed in one circuit of the ball nut, an increase in a normal friction torque and the ball clogging phenomenon do not occur.

Still further, since the biting phenomenon of the balls on the surface of the ball screw groove caused by the friction among the balls do not occur even during a reciprocating movement, an increase in a reciprocating friction torque and the ball clogging phenomenon do not occur.

EMBODIMENTS OF THE INVENTION

Figure 1:
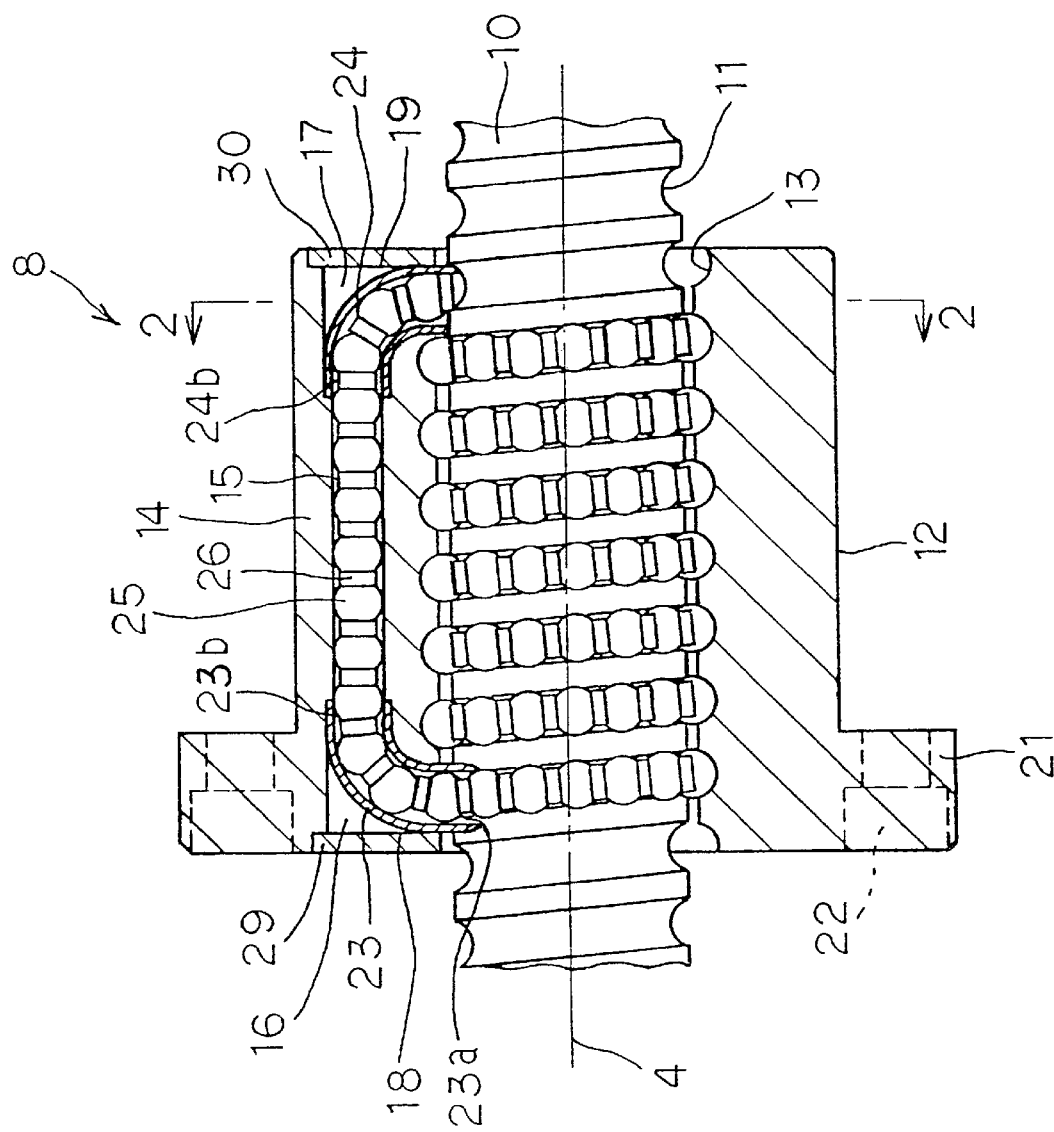
FIG. 1 is a vertical section of a first embodiment of the present invention.

Referring to the drawings, embodiments of the present invention will now be described.

Figure 2:
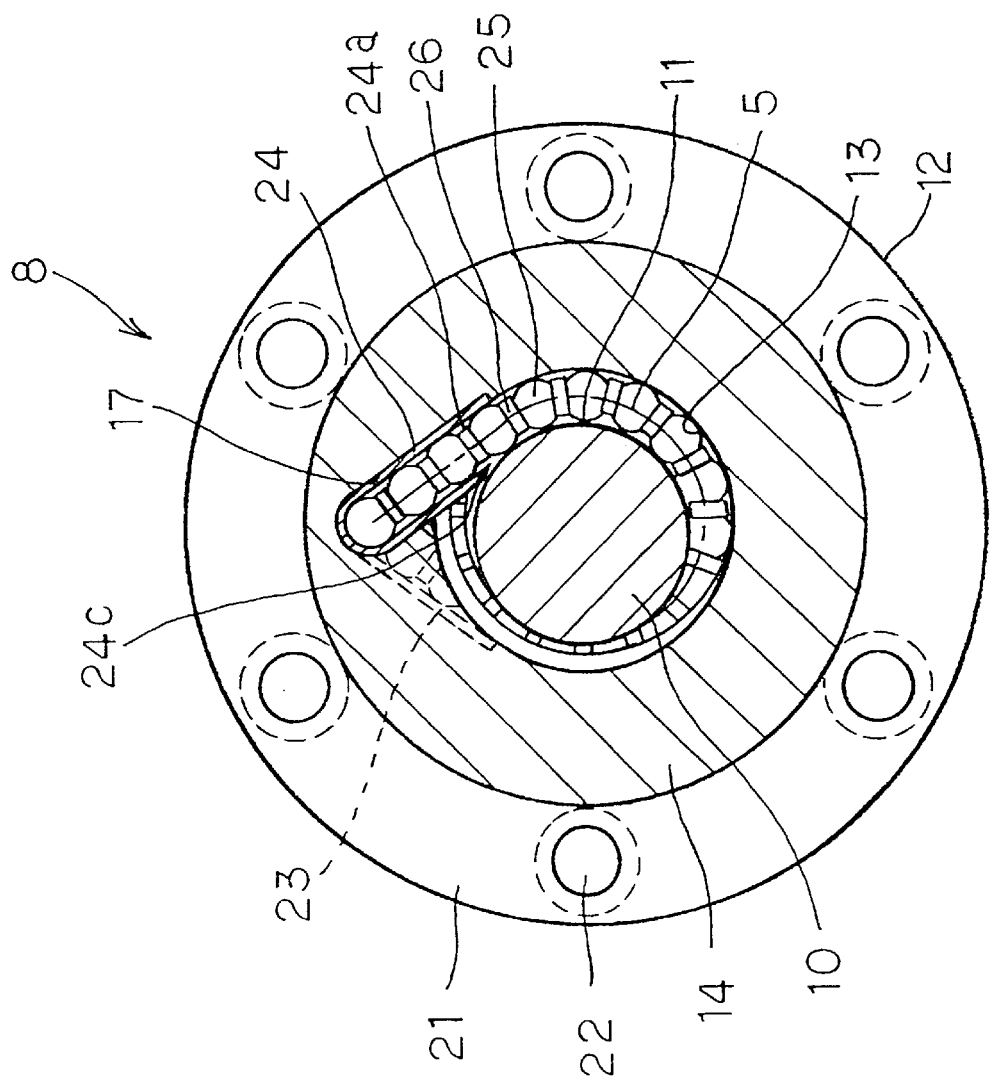
FIG. 2 is a section being taken along line 2—2 in FIG. 1, looking in the direction of the appended arrows.
Figure 3:
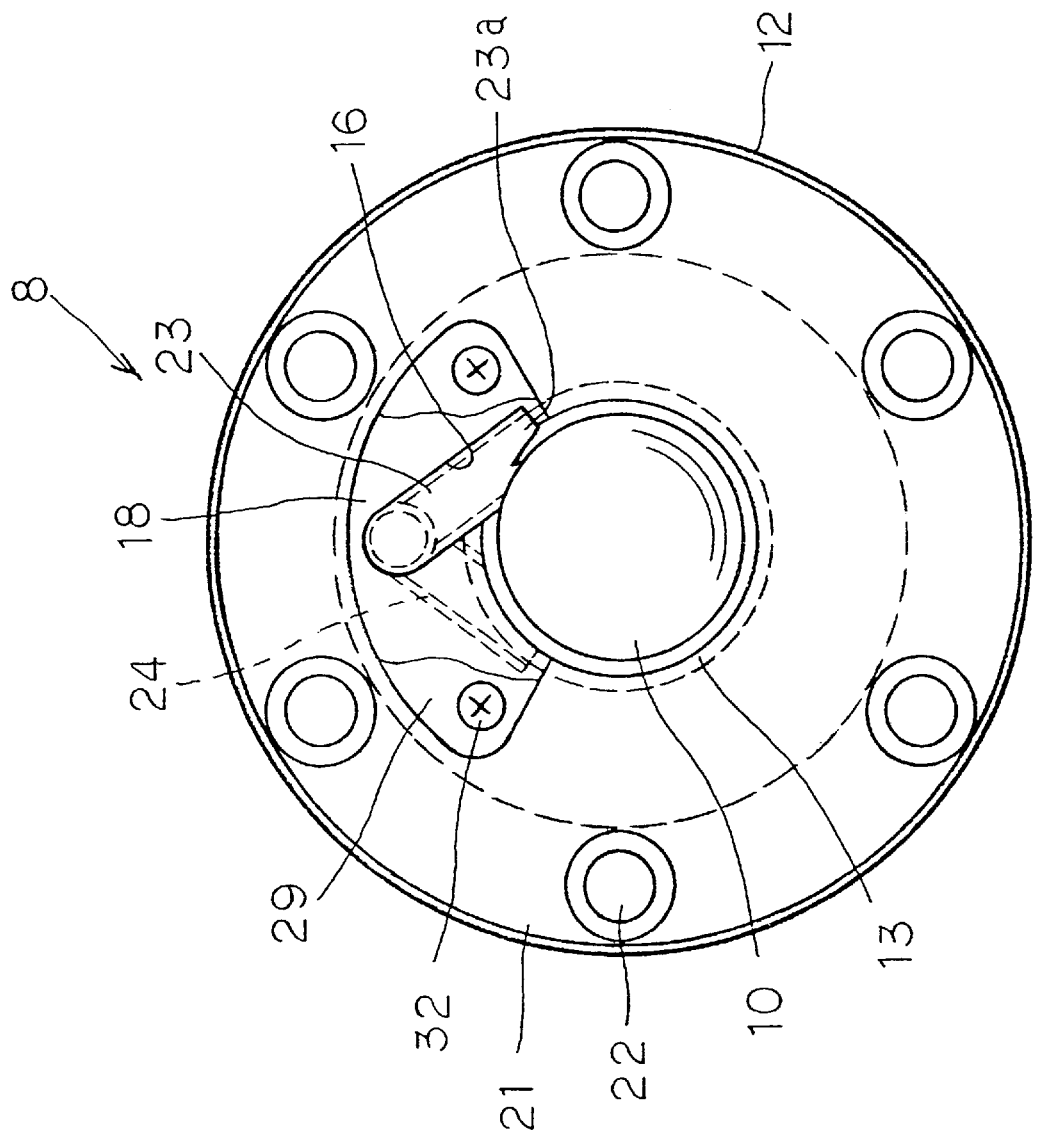
FIG. 3 is a left side view of FIG. 1 with a cover partially broken away.

As shown in FIGS. 1 through 3, a ball screw 8 of the present invention comprises: a screw shaft 10 including in the outer peripheral surface thereof a single ball screw groove 11 in the shape of a Gothic arch (not shown); a ball nut 12 including in the inner peripheral surface thereof another single ball screw groove 13 in the shape of a Gothic arch (not shown) opposed to the ball screw groove 11; a ball circulation mechanism including a through hole 15 and adapters 23, 24; a plurality of balls 25 which are interposed between the both ball screw grooves 11, 13 and installed within the ball circulation mechanism; and a plurality of spacers 26 disposed between the adjoining balls 25, 25. Further, reference numerals 21 and 22 designate respectively a flange portion and a thread insertion hole for mounting the ball nut 12 on a machine and so on.

A configuration of the ball nut 12 will now be described.

Figure 4:
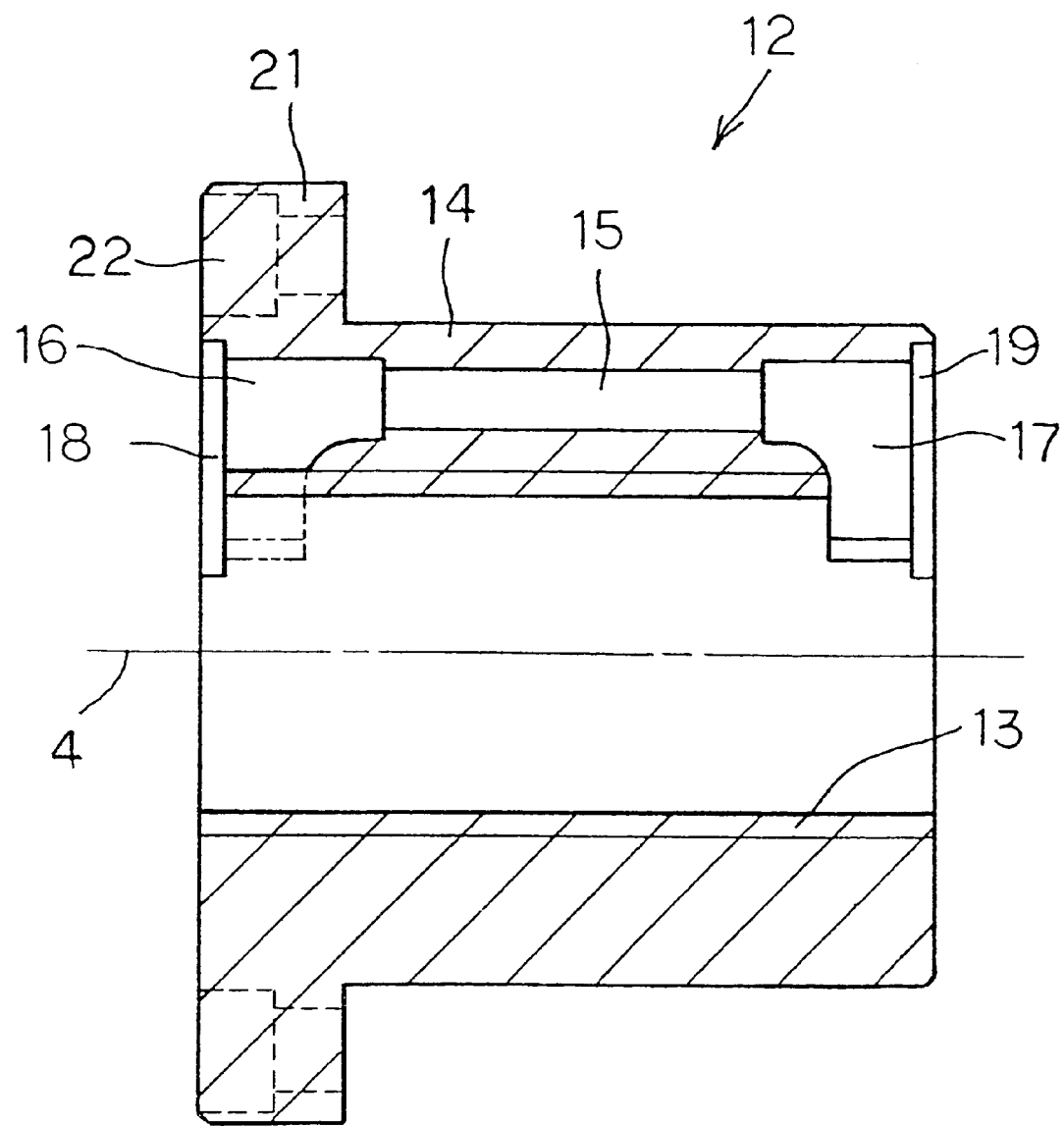
FIG. 4 is vertical section of a ball nut (a section being taken along line 4—4 in FIG. 5, looking in the direction of the appended arrows)
Figure 5:
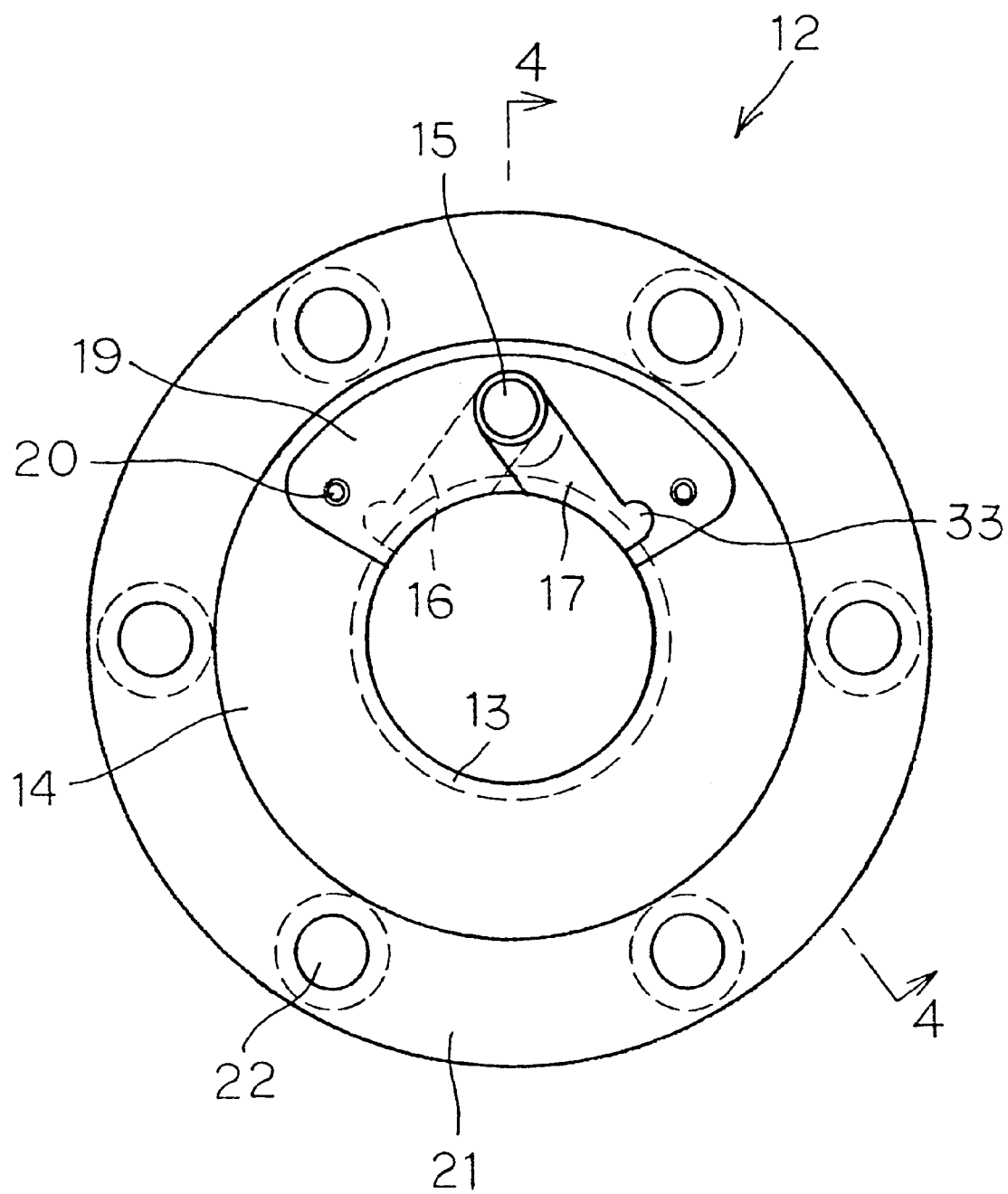
FIG. 5 is a right side view of FIG. 4.

As shown in FIGS. 4 and 5, in a thick wall part 14 of the ball nut 12, there is the through hole 15 provided in parallel to an axial line 4 of the ball nut 12. Also, on a respective axial end in the thick wall part 14, there formed recesses 16, 17 communicating with a through hole 15 and being symmetrically arranged in respect to the through hole 15 such that open ends 23a, 24a of adapters 23, 24 to be fitted extend tangentially with respect to an imaginary cylinder 5. The imaginary cylinder is a trajectory of the center of a ball 25 between the both ball screw grooves 11, 13 (see FIGS. 2 and 6). Further, there are recesses 18, 19 for a cover to be fitted formed on the axial outer surface of the recesses 16, 17. In these recesses 18, 19 for the covers to be fitted, covers 29, 30 for preventing the adapters 23, 24 from falling out are each fitted. Further, reference numerals 20 and 33 designate a screw hole for securing the covers 29, 30 and a room (shown in FIG. 5 only) for the machining operation, respectively.

A configuration of adapters 23, 24 will now be described. Incidentally, since the adapter 24 has the same configuration as that of the adapter 23, the description thereof is omitted here.

Figure 6:
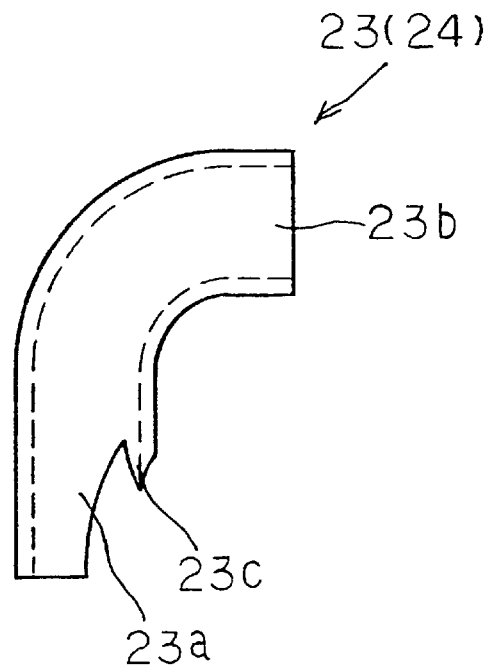
FIG. 6 is a front view of an adapter.

As shown in FIG. 6, the adapter 23 is a hollow circular pipe which is bent generally in the shape of L. On one open end 23a thereof, there is a tongue portion 23c formed for scooping up or returning the balls 25 between the both ball screw grooves 11, 13. Also, the other open end 23b is connected to be in communication with a through hole 15 of the ball nut 12.

Further, the followings are to be noted:

1) Adapters 23, 24 may be, like split return tubes known, a combination of splitted portions. Although not shown, it may be a combination of two flat plates each being provided with a generally L-shaped semi-circular groove.

2) The ball 25 comes into collision with the tongue portion 23c (24c) when leaving the ball screw groove 11 to enter the adapter 23 (24) and going out of the adapter 24 (23) to be bitten by the ball screw groove 11. Accordingly, when a diameter of the ball 25 used is large, the tongue portions 23c, 24c may be damaged through repeated collisions of the ball 25. In such a case, like the embodiments disclosed in FIGS. 3 and 4 of the United States Patent quoted as a prior art, instead of the tongue portions on open ends 23a, 24a of the adapters 23, 24, a known deflector, which is a separate body, may be used to perform the same role as what the tongues do. Thus, the expression "one open end on which a tongue portion for scooping upor returning balls between the both ball grooves" used in the claims is a concept to include the above-mentioned case.

A configuration of the spacer 26 will now be described.

Figure 7:
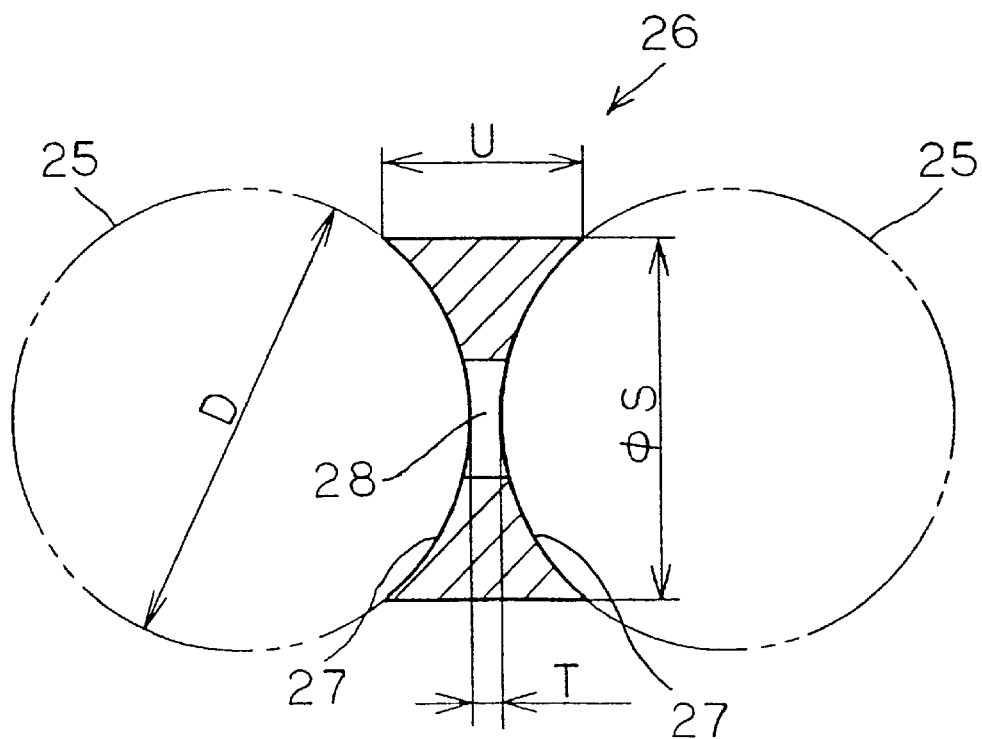
FIG. 7 is a vertical section of a spacer.

As shown in FIG. 7, the cylinder-shaped (or disk-shaped) spacer 26 includes concave surfaces 27, 27 complementary to the spherical surface of the ball 25 at the both axial ends thereof, and the concave surfaces 27, 27 are disposed so as to face the a djacent balls 25, 25 for slidably receiving the balls 25, 25. In terms of a stabilized support and so on of the spacer 26 by the ball 25 and a smooth circulation of the ball 25 and the spacer, a diameter S of the spacer 26 is set to be 60% to 80% of a diameter D of the ball 25. Moreover, a thickness T of the spacer 26 to define the gap between the adjacent balls 25, 25, namely, a gap between the vertexes of the adjacent balls 25, 25 with the spacer 26 therebetween (provided that the existence of a lubricant is not considered) is set to be 0.1 mm to 0.3 mm in terms of securing a high load-carrying capacity by installing as many balls 25 as possible and in terms of a smooth circulation of the ball 25 and the spacer 26. Further, reference characters 28 and U designate an axial through hole serving as an oil pocket for a lubricant (grease or oil) and an axial length of the spacer 26, respectively.

Materials of the spacer 26 will now be described.

Though the spacer 26 is made of plastic materials such as DURACON (a trademark of Polyplastic Co.), it may be made of self-lubricating materials such as sintered oilless metal or TEFLON (a trademark of Du Pont de Nemours) and the like. The spacer 26 can also be made of a plastic containing therein a lubricant (see Japanese Patent Publication No. 3455/1972, for example) or a porous plastic impregnated with a lubricant (see Japanese Unexamined Patent Publication No. 283634/1986, for example).

A configuration of covers 29, 30 will now be described.

Figure 8:
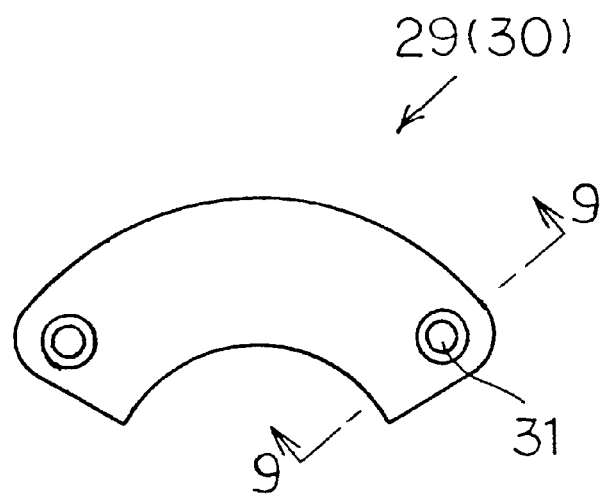
FIG. 8 is a front view of a cover.
Figure 9:
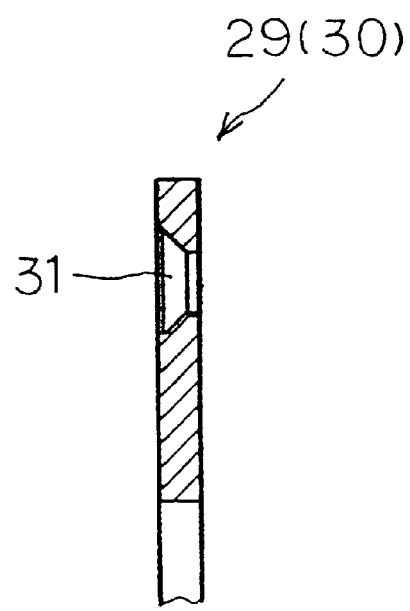
FIG. 9 is a vertical section being taken along line 9—9 in FIG. 8, looking in the direction of the appended arrows.

As shown in FIGS. 8 and 9, in the covers 29, 30 for preventing adapters 23, 24 from falling out, there is further a thread insertion hole 31 formed for a machine screw 32 to be inserted.

Next, a method of assembling a ball screw 8 will be described.

Adapters 23, 24 are each fittingly inserted into recesses 16, 17 on the ball nut 12. Covers 29, 30 are fitted into cover receiving concavities 18, 19. Subsequently, the machine screw 32 is screwed into a screw hole 20, and the covers 29, 30 are each fastened to the ball nut 12. Then, a sleeve having an outer diameter which is 0.2 mm to 0.4 mm smaller than a minor diameter of the ball screw groove 11 of the screw shaft 10 is inserted into the ball nut 12, and the ball nut 12 is longitudinally mounted on the base (not shown). Through the gap between the upper end portion of the ball screw groove 13 and the end portion of the sleeve, the ball 25 and the spacer 26 are alternately inserted. Finally, when a gap is produced, a spacer corresponding to the size of the gap is incorporated so as to minimize the gap. Then, the sleeve is pressed to an end face of the screw shaft 10. With the sleeve being pressed, when the ball nut 12 is rotated in the twisted direction while being lightly pressed in the direction of the incorporation, the ball nut 12 is moved toward the screw shaft 10. When the ball nut 12 is completely moved to the screw shaft 10, the assembly of the ball screw 8 is completed. And when the screw shaft 10 is rotated laterally, as seen in FIGS. 1 and 2, the ball 25 and the spacer 26 circulate smoothly and the ball nut 12 moves back and forth. Further, In FIG. 2, one open end 24a of the adapter 24 extends tangentially with respect to an imaginary cylinder 5, which is a trajectory of a center of the ball 25 between the both ball screw grooves 11, 13. However, the direction in which the open end extends does not have to be tangential.

Next, referring to specific numerical values, operations of the present invention will be described.

According to the ball screw 8 of the present invention, the number of effective turns will be 6.7×1, while the same will be at most 3.5×1 in the case of a conventional "return tube", on condition that elements of the ball screw are as follows:

Shaft diameter of shaft screw 10 . . . 32 mm, Lead . . . 10 mm,

Lead angle . . . 5° 23', Diameter of ball 25 . . . 6.35 mm,

Center circle diameter of ball 25 . . . 33.8 mm,

Entire length of ball nut 12 . . . 82 mm (Length of flange portion 21 . . . 16 mm), Outer diameter of ball nut 12 . . . 74 mm (Outer diameter of flange portion 21 . . . 105 mm)

Further, when a spacer 26, which has elements including S=5 mm, T=0.2 mm and U=2.2 mm, is disposed between the adjoining balls 25, 25, a conventional "return tube" can have 70 balls 25 and 70 spacers 26 in one circuit, and the number of balls in the number of effective turns concerning an axial load is about 57.

On the other hand, according to the ball screw 8 of the present invention, 124 balls 25 and 124 spacers 26 can be installed in one circuit, and the number of balls in the number of effective turns is 109.

Then, compared with a conventional ball screw, the ball screw 8 of the present invention exhibits the following features:

(1) Axial load carried amounts to 109/57, namely, about 1.9 times as much as that of a conventional type.

(2) Basic dynamic load rating showing a load-carrying capacity is 1.75 times as much as that of a conventional type (see ISO/DIS 3408-5).

(3) The stiffness of the ball nut 12 is 1.5 times as much as that of the conventional type (see "Ball Screw Application Technology", written by Minoru Izawa and issued by Kogyo Chosakai Publishing Co., Ltd., the first edition (1993. 5.20), pp 71–72).

Moreover, the use of the spacer 26 brings about the following advantages:

(4) Even when more than 120 balls 25 are installed in one circuit of the ball nut 12, an increase in a normal friction torque and the ball clogging phenomenon do not occur.

(5) Even in the reciprocating movement, there is no biting phenomenon of the ball 25 on the face of ball screw groove 11 caused by the friction between the balls 25, 25, and accordingly there is no increase in a reciprocating friction torque and no clogging phenomenon of the ball 25 produced.

(6) The ball 25 and the spacer 26 makes an oil film contact on a broader surface, namely, makes an oil film contact at a low pressure per unit area. Therefore, unlike a conventional ball screw, the ball screw of the invention may not lack oil film because of the point contact of the balls at a higher pressure per unit area and the ball screw will have a longer life.

Figure 10:
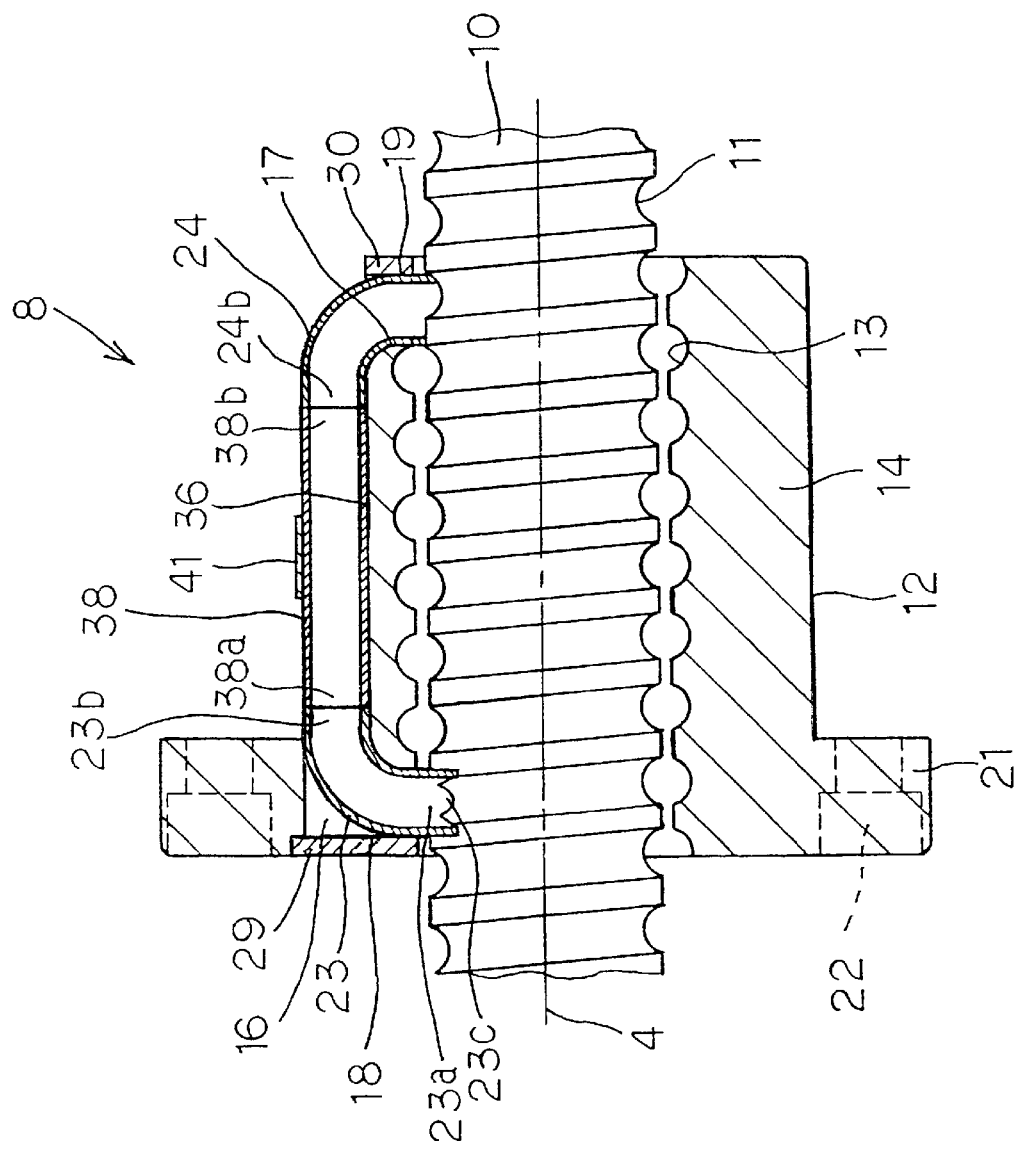
FIG. 10 is a vertical section of a second embodiment of the present invention.
Figure 11:
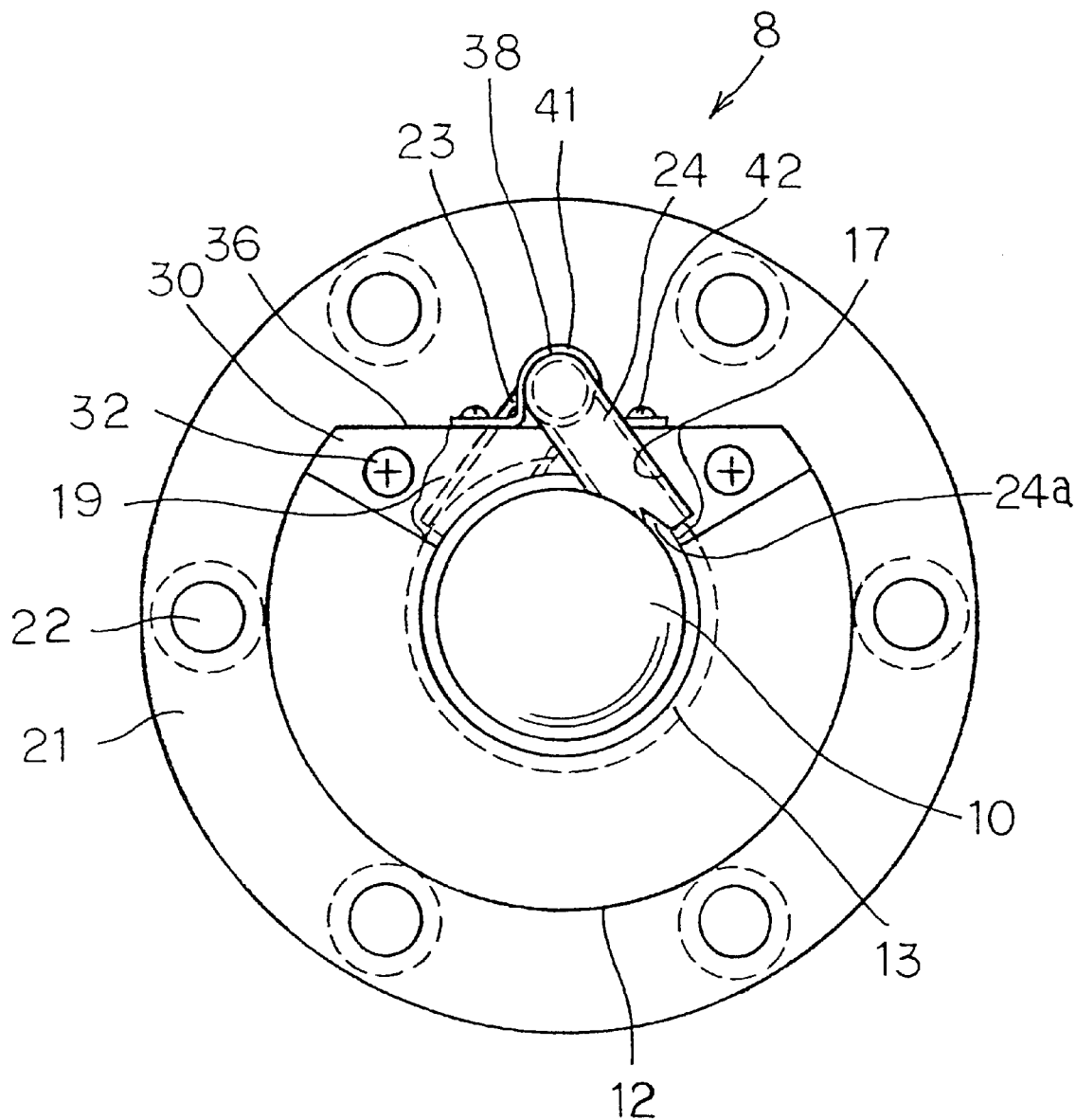
FIG. 11 is a right side view of FIG. 10.
Figure 12:
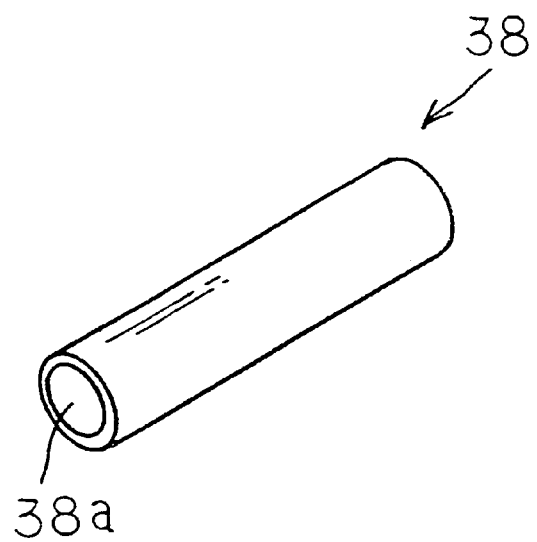
FIG. 12 is a perspective view of a tube.

Next, referring to FIGS. 10 through 12, a second embodiment of the present invention will be described. Incidentally, like numerals as in the first embodiment are given to like parts, and the description thereof is omitted (except that the portions corresponding to recesses 16, 17 are renamed as recessed portions 16, 17). Also, the ball 25 and the spacer 26 are not shown in the drawing.

The second embodiment is applied when the thick wall part 14 of the ball nut 12 is not thick enough for a through hole 15 to be provided therein.

A flat notch surface 36 is formed on an outer peripheral surface of the ball nut 12. On the notch surface 36, a straight tube 38 is mounted by a tube retaining member 41 and a set screw 42 in parallel to an axial line 4 of the ball nut 12. Then, a circulation mechanism of the ball 25 and the spacer 26 is formed when the both open ends 38a, 38b of the tube 38 are each in communication with the open ends 23b, 24b of the adapters 23, 24.

Since its operation is the same as the one in the first embodiment, the description thereof is omitted.

Figure 13:
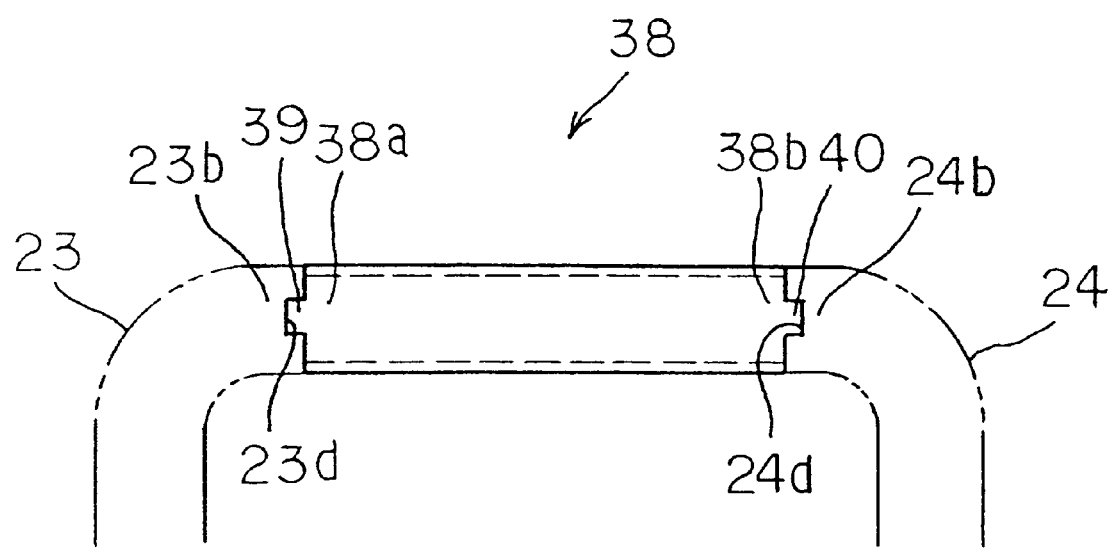
FIG. 13 is a front view showing a modified form of a tube.

FIG. 13 shows a modified form of the tube 38. On both open ends 38a, 38b of the tube 38, there is a protrusion (or a recess) 39, 40 formed respectively. By engaging this protrusion (or recess) 39, 40 with the recess (or protrusion) 23d, 24d formed on the open ends 23b, 24b of the adapters, the tube 38 and adapters 23, 24 are connected to be in communication reliably.

Further, in this second embodiment, followings are also applicable:

1) Instead of on the flat notch surface 36 provided on the outer peripheral surface of the ball nut 12, the tube 38 may be mounted directly on the outer peripheral surface of the ball nut 12.

2) Though the tube 38 and the adapters 23, 24 are formed as separate bodies, each end of the tube may be bent to be formed into a portion which takes place of the adapter.

ADVANTAGES OF THE INVENTION

The advantages in accordance with the present invention are as follows:

(1) Since balls can be installed throughout almost the entire length of the ball nut, compared with a conventional type having a ball nut whose outer diameter and entire length are the same, a ball screw having a higher load-carrying capacity and greater stiffness can be obtained.

(2) Describing (1) conversely, when the load-carrying capacities are the same, the size of the ball screw can be minimized and the cost thereof can be reduced.

(3) Even when more than 120 balls are installed in one circuit of the ball nut, an increase in a normal friction torque and the ball clogging phenomenon do not occur.

(4) Even in a reciprocating movement, since the ball biting phenomenon on the surface of the ball screw groove caused by the friction among the balls do not occur, an increase in a reciprocating friction torque and the ball clogging phenomenon do not occur, either.

(5) The ball and the spacer make an oil film contact on a broader surface, namely, make an oil film contact at a low pressure per unit area. Therefore, unlike a conventional ball screw, the ball screw of the present invention may not lack oil film at a high pressure per unit area by the point contact of the balls, and the life of the ball screw can be longer.

(6) When the thickness of the spacer to separate the adjoining balls is within the range of 0.1 mm to 0.3 mm, more balls can be installed so as to secure a high load-carrying capacity.

(7) When one open end of the adapter extends tangentially with respect to an imaginary cylinder, which is a trajectory of the center of a ball 25 between the both ball screw grooves, the ball and the spacer circulate more smoothly.

What is claimed is:

1. A ball screw, comprising: a screw shaft having an outer peripheral surface; a ball screw groove on the outer peripheral surface; a ball nut having an axis, a thick wall, and an inner peripheral surface; another ball screw groove on the inner peripheral surface of the ball nut, spaced uniformly from said axis and opposed to the ball screw groove on the outer peripheral surface of the screw shaft; a plurality of balls, of uniform size and having spherical surfaces, installed in a series along a helix between said ball screw grooves, each ball in the series being adjacent two other balls in the series; and a ball circulation mechanism provided in the ball nut for transferring balls from one location on the ball screw to another location on the ball screw;

wherein a spacers having at each end thereof a concave surface complementary to the spherical surfaces of the balls, is disposed between the balls of each pair of adjacent balls;

wherein the thick wall of the ball nut has opposite ends axially spaced from each other, each said end having a recess for receiving an adapter inserted into the recess in a direction parallel to said axis; and wherein the ball circulation mechanism comprises; a through hole which extends in parallel to the axis of the ball nut inside said thick wall of the ball nut, the through hole having opposite ends; and a pair of adapters, one adapter being located adjacent each end of the ball nut, each said adapter having one open end provided with a tongue portion for scooping up balls from, and returning balls to, the ball screw grooves, and another open end connected to, and in communication with, an end of the through hole, and the adapters being fitted respectively in said recesses in the axially spaced oposite ends of the thick wall of the ball nut.

2. A ball screw according to claim 1, wherein each said spacer maintains the closest approach of the adjacent balls between which it is located within the range of 0.1 mm to 0.3 mm.

3. A ball screw according to claim 1, wherein each said adapter comprises an L-shaped tube, and wherein said one open end of the adapter is in a leg of said L-shaped tube extending tangentially with respect to an imaginary cylinder in which a helical trajectory of the center of a ball located between the ball screw grooves lies.

4. A ball screw, comprising: a screw shaft having an outer peripheral surface; a ball screw groove on the outer peripheral surface; a ball nut having an axis, a wall, and an inner peripheral surface; another ball screw groove on the inner peripheral surface of the ball nut, spaced uniformly from said axis and opposed to the ball screw groove on the outer peripheral surface of the screw shaft; a plurality of balls, of uniform size and having spherical surfaces, installed in a series along a helix between said ball screw grooves, each ball in the series being adjacent two other balls in the series; and a ball circulation mechanism provided in the ball nut for transferring balls from one location on the ball screw to another location on the ball screw;

- wherein a spacer, having at each end thereof a concave surface complementary to the spherical surfaces of the balls, is disposed between the balls of each pair of adjacent balls;
- wherein the wall of the ball nut has opposite ends axially spaced from each other, each said end having a recess for receiving an adapter; and
- wherein the ball circulation mechanism comprises; a tube mounted in parallel to said axis of the ball nut on the exterior of the ball nut; and
- a pair of adapters, one adapter being located adjacent each end of the ball nut, each said adapter having one open end provided with a tongue portion for scooping up balls from, and returning balls to, the ball screw grooves, and another open end connected to, and in communication with, an end of the tube, and the adapters being fitted respectively in said recesses in the axially spaced opposite ends of the ball nut.

5. A ball screw according to claim 4, wherein each said spacer maintains the closest approach of the adjacent balls between which it is located within the range of 0.1 mm to 0.3 mm.

6. A ball screw according to claim 4, wherein each said adapter comprises an L-shaped tube, and wherein said one open end of the adapter is in a leg of said L-shaped tube extending tangentially with respect to an imaginary cylinder in which a helical trajectory of the center of a ball located between the ball screw grooves lies.

7. A ball screw according to claim 4, wherein at least one of said recesses has a clearance enabling it to receive an adapter inserted into the recess in a direction parallel to said axis.

8. A ball screw according to claim 7, wherein the ball nut has a mounting flange at least part of which is located directly radially outward from said one of said recesses.

* * * * *